(12) United States Patent
Albert

(10) Patent No.: US 11,932,513 B2
(45) Date of Patent: Mar. 19, 2024

(54) DUEL SOURCE LIGHT SYSTEM

(71) Applicant: SafeWorks, LLC, Tukwila, WA (US)

(72) Inventor: Russell Albert, Lynnwood, WA (US)

(73) Assignee: SafeWorks, LLC, Tukwila, WA (US)

( * ) Notice: Subject to any disclaimer, the term of this patent is extended or adjusted under 35 U.S.C. 154(b) by 92 days.

(21) Appl. No.: 17/602,976

(22) PCT Filed: Apr. 10, 2020

(86) PCT No.: PCT/US2020/027822
§ 371 (c)(1),
(2) Date: Oct. 11, 2021

(87) PCT Pub. No.: WO2020/210738
PCT Pub. Date: Oct. 15, 2020

(65) Prior Publication Data
US 2022/0185629 A1    Jun. 16, 2022

Related U.S. Application Data

(60) Provisional application No. 62/832,188, filed on Apr. 10, 2019.

(51) Int. Cl.
*B66B 11/02* (2006.01)
*B66B 5/02* (2006.01)
(Continued)

(52) U.S. Cl.
CPC ............ *B66B 11/0233* (2013.01); *B66B 5/02* (2013.01); *B66B 7/064* (2013.01); *F03D 80/88* (2016.05);
(Continued)

(58) Field of Classification Search
CPC ....... B66B 11/0233; B66B 5/02; B66B 7/064; F03D 80/88; F21S 9/022; F21V 23/001; F21Y 2115/10
See application file for complete search history.

(56) References Cited

U.S. PATENT DOCUMENTS

| | | | | | |
|---|---|---|---|---|---|
| 3,294,977 | A | * | 12/1966 | Duncan | H02J 9/02 307/64 |
| 3,808,499 | A | * | 4/1974 | Edwards | H05B 39/10 307/64 |
| 4,056,757 | A | * | 11/1977 | Mauch | H02J 9/065 307/64 |

(Continued)

OTHER PUBLICATIONS

International Patent Application No. PCT/US2020/027822; Int'l Preliminary Report on Patentability; dated Oct. 21, 2021; 9 pages.

(Continued)

*Primary Examiner* — Michael A Riegelman
(74) *Attorney, Agent, or Firm* — Foley & Lardner LLP

(57) ABSTRACT

Elevator systems, methods, and devices comprising dual source light systems are described herein. Such elevator systems may be associated with or located within wind turbines and wind turbine towers. In embodiments, an elevator cabin may comprise a dual source light system further comprising at least one light source, a supercapacitor unit, an electronic circuit electrically connected to the at least one light source and the supercapacitor, and a housing unit. The dual source light system can receive energy from an external power source, convert one or more characteristics of the energy, e.g., voltage or current, and distribute the energy to the at least one light source. Any excess energy can be used to charge the supercapacitor such that when energy from the external power source is insufficient to power the at least one light source, such as during an outage, the electronic circuit draws energy from the charged supercapacitor.

20 Claims, 6 Drawing Sheets

(51) Int. Cl.
   *B66B 7/06* (2006.01)
   *F03D 80/80* (2016.01)
   *F21S 9/02* (2006.01)
   *F21V 23/00* (2015.01)
   *F21Y 115/10* (2016.01)

(52) U.S. Cl.
   CPC ............ *F21S 9/022* (2013.01); *F21V 23/001* (2013.01); *F21Y 2115/10* (2016.08)

(56) References Cited

U.S. PATENT DOCUMENTS

| | | | | |
|---|---|---|---|---|
| 4,708,223 A * | 11/1987 | Orndorff | ................ | H02J 9/065 |
| | | | | 315/86 |
| 8,558,407 B2 * | 10/2013 | Mandy | ................ | H05B 45/39 |
| | | | | 315/86 |
| 8,686,662 B1 * | 4/2014 | Bragg | ................ | H02J 9/065 |
| | | | | 315/159 |
| 9,035,494 B2 * | 5/2015 | Mandy | ............... | H05B 45/3725 |
| | | | | 307/64 |
| 9,431,855 B1 * | 8/2016 | Hetrick | ................ | H02J 9/065 |
| 9,499,375 B2 * | 11/2016 | Talonen | ................ | F03D 13/40 |
| 10,890,302 B2 * | 1/2021 | Boulanger | ............... | F21S 9/022 |
| 11,482,881 B2 * | 10/2022 | Rose | ............... | H02M 7/5395 |
| 2005/0195594 A1 * | 9/2005 | Kurtz | ................ | F21V 23/0442 |
| | | | | 362/276 |
| 2010/0061076 A1 * | 3/2010 | Mandy | ................ | F21V 19/04 |
| | | | | 362/523 |
| 2012/0187852 A1 * | 7/2012 | Mandy | ................ | H05B 45/39 |
| | | | | 315/175 |
| 2013/0163270 A1 * | 6/2013 | Burgin | ............... | B66B 11/0233 |
| | | | | 362/546 |
| 2014/0130420 A1 * | 5/2014 | Talonen | ................ | F03D 80/00 |
| | | | | 187/250 |
| 2020/0340635 A1 * | 10/2020 | Boulanger | ............. | F21S 9/022 |
| 2022/0185629 A1 * | 6/2022 | Albert | ...................... | B66B 5/02 |

OTHER PUBLICATIONS

International Patent Application No. PCT/US2020/027822; Int'l Search Report/Written Opinion; dated Jul. 10, 2020; 14 pages.

\* cited by examiner

DUEL SOURCE LIGHT SYSTEM

CROSS-REFERENCE

This application claims the benefit of Provisional U.S. Patent Application No. 62/832,188, filed Apr. 10, 2019, the contents of which are incorporated herein by reference in their entirety.

BACKGROUND

Battery powered lighting systems are commonly utilized in wind turbines, elevators, lifts, hoists, hallways, and other building and construction site areas in remote locations. In many of these environments, which may be infrequently accessed, such as wind turbines and elevator shafts, one or more low-powered lights can keep an area (e.g., a wind turbine or elevator shaft), a device (e.g., an exit sign), a vehicle (e.g., elevator cab), or other application constantly illuminated for safety considerations and aesthetic purposes. Unfortunately, such remote areas and environments are generally exposed, and may be subject to harsh environments and infrequent maintenance, which can all result in loss of power or unexpected failure.

Many conventional and widely-implemented lighting systems rely on a battery as a main power source or at least as a back-up power if the main power source fails. However, any failure of these lighting systems and back-up power sources can place workers in significant danger, leaving them stranded, alone, and unable to see in a potentially precarious and remote environment.

Battery-powered lighting systems face significant limitations with respect to lifespan, durability, and power consistency, especially in environments with significant weather and temperature fluctuations. Battery capacity, for example, decreases over time and in both cold and hot environments. A battery in a cold environment, such as in an outdoor lighting system, e.g., an illuminated sign, construction lift, or safety light, will need to warm up to a certain temperature before properly discharging and illuminating a light source. Batteries in such systems generally need to be changed every few years, and/or regularly checked, e.g., charged at least every year, to ensure proper functioning. Rechargeable batteries face similar issues, with the added limitation of slow charging times, and a limited number of recharge cycles.

In applications that are not easily accessible, and/or when numerous battery-powered lighting systems are required, such maintenance becomes more difficult, less practical, and cost more as a result. In addition, batteries and the systems in which they are installed face portability issues. All airlines and many shipping carriers place restrictions on the type of batteries that can be transported, like lithium batteries. As a result, transportation and shipment costs are increased and/or alternative battery types and power methods must be utilized.

Accordingly, more durable and reliable power sources and backup power sources, especially in wind turbines, are needed to address many of the above limitations. Safety applications, in particular, would benefit from power sources capable of operating in a range of conditions, and having longer lifespans and power capacity.

SUMMARY

Systems, methods, and devices are disclosed, which generally relate to elevator systems comprising dual source lightings systems. Various embodiments relate to elevator systems associated with wind turbines, and elevator cabins within wind turbine towers. In embodiments, an elevator system may comprise: an elevator cabin within a wind turbine; a traction wire rope for vertically driving the elevator cabin; a traveling power cable providing a power source to the elevator cabin: and a housing unit installed in the elevator cabin, the housing unit containing a supercapacitor, an electronic circuit, and at least one light source. In examples, as discussed herein, the electronic circuit may distribute energy received from the traveling power cable to power the at least one light source, and charge the supercapacitor using any remaining energy. In addition, when the energy received from the traveling power cable is insufficient to power the at least one light source, the electronic circuit may draw energy from the charged supercapacitor to power the at least one light source for a period of time to allow sufficient power to be received from the power source to power the at least one light source.

In examples, the electronic circuit can allocate power between the at least one light source and the supercapacitor based on an amount of power received from the power source, and the power cable may be directly or indirectly connected to the housing unit. At least one light source may be an LED, a fluorescent light, an incandescent light, and an outdoor/weather-resistant light, and the supercapacitor may be configured to power the light source for a period of time required by a local, regional, or national safety standard.

BRIEF DESCRIPTION OF THE DRAWINGS

The foregoing summary, as well as the following detailed description of illustrative embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION OF ILLUSTRATIVE EMBODIMENTS

Various aspects of the present disclosure as described herein are generally directed to dual source light systems, methods, and devices. In various embodiments, failsafe emergency lighting systems may be provided to applications such as wind turbines, elevator shafts, and remote or infrequently accessed sites, to provide a reliable and safe lighting environment for workers accessing such areas.

In a non-limiting example, as applied to an elevator system, the present invention also helps insure that back-up safety lighting systems will be available and functioning with a high degree of certainty, whenever the elevator has power. Power for the failsafe emergency lighting system may be drawn from the same power source that moves the elevator cab, and charges a super capacitor, which will power the lighting system in the event of a failure. As such, workers can be confident in the back-up lighting system, since any power to the elevator cab during the individual's use indicates that there will be power to the super capacitor, and a failure of the main power system automatically results in the emergency lighting system drawing power from the supercapacitor. Thus, workers have a significantly lowered risk of being left alone in a wind turbine elevator shaft or other dangerous environment.

Figure 1:
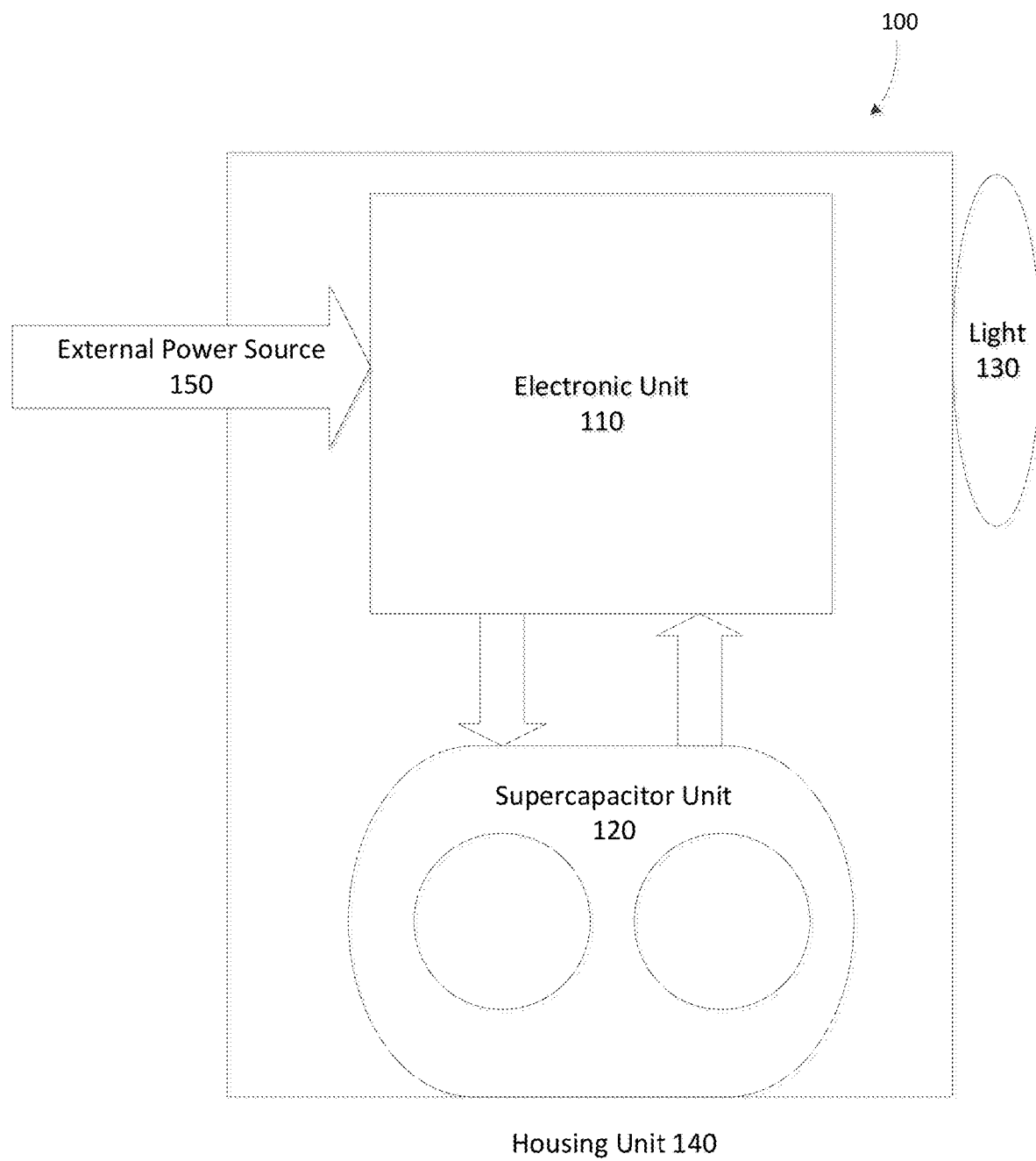
FIG. 1 illustrates a dual source light system in accordance with embodiments.

FIG. 1 illustrates an example dual source light system in accordance with various embodiments disclosed herein. The dual source light system may comprise an electronic unit 110, a supercapacitor unit 120, and at least one light source 130. The system can further comprise a housing unit 140 housing each of the components, and, in examples, able to be mounted, installed, affixed, or otherwise fastened to an elevator shaft, wind turbine, enclosure, or other area of application. As applied, the dual source light system may be able to provide a source of energy for lighting or other purposes using the supercapacitor unit, in the event that the external power source 150 or other associated power source, e.g., an elevator system, loses power.

With respect to FIG. 1, the electronic unit 110 further comprises an electronic circuit configured to receive power from an external power source 150 and distribute the energy to the light source 130 and supercapacitor unit 120. The external power source can be service power from a utility service, delivered in the form of alternating current (AC) or direct current (DC). In various embodiments, the external power source 150 may be a power source associated with an elevator system, wind turbine, building, enclosure, generator, vehicle, or any of a variety of mechanical systems and spaces using in conjunction with a power source. In non-limiting examples, such power can take the form of the standard 50-60 Hz AC and 110-220 V, or other frequencies and voltages, required by an application.

The electronic unit 110 may be configured to convert alternating current to direct current and deliver energy directly to each of the one or more light sources 130 and the supercapacitor unit 120. In embodiments, the external power source 150 is configured to be a primary power source for a light system, which may be light sources 130 or other external light sources. For example the external power source 150 may be connected to the electronic unit 110 to directly power the light source 130, connected to an external light source, such as main lighting in an elevator, elevator shaft, hallway, sign, etc., and/or connected to both.

In this manner, once the external power 150 is connected to the light system 100, power may be transferred to one or both of the light 130 and the supercapacitor unit 120. In an example, the external power source 150 transfers energy such that the light 130 illuminates and the supercapacitor unit 120 begins to charge. During this time, the supercapacitor unit 120 does not provide power the light source 130. Put another way, when the external power source, e.g., elevator power, is connected and providing energy, the external power source is utilized to provide lighting to light sources 130. In an example, the external power source powers a lighting system associated with an elevator, e.g., interior lights, buttons, etc., and any excess energy is used to power the supercapacitor unit 120. In this manner, when the external power source 150 provides energy to the system, or provides energy above a threshold level to the system, the supercapacitor 120 does not power the light source 130.

In some embodiments, the external power source is a battery, a generator, or any of a plurality of systems or combinations of systems providing energy. In other embodiments, the external power source is not a battery. Additionally, the electronic unit 110 can be further configured to first provide power to illuminate the light source 130 rather than charge the supercapacitor unit 120. For example, a switch or other control, which may be manual, automatic, or used in conjunction with a control system, may specify when, how, and in what manner the electronic unit distributes energy to the light source 130 and supercapacitor unit 120, respectively. In some cases, when the amount of external power is below a certain threshold, the electronic unit 110 may direct such energy directly to one of the light 130 or the supercapacitor unit 120. In other examples, when the amount of external power is at or above a certain threshold, the electronic unit 110 distributes energy to both the light 130 and the supercapacitor 120, and may, through one or more circuits and manual or computed-implemented rules, prioritize one over the other, or evenly distribute the energy. In these situations, especially when sufficient power is received, the supercapacitor unit 120 does not transfer energy to the light source 130.

Accordingly, when a power outage occurs, i.e., a lack of power from the external power source 150, and/or the amount of power received from the external power source falls below a certain threshold 150, the charged supercapacitor unit 120 can be used to power the light source 130. In one example, an elevator system may be powered by a battery, generator, or other power source, and lighting systems, which may or may not be light source 130, are powered by this external power source. The external power source, directly connected to light system 100, also charges the supercapacitor unit 120. If the elevator were to lose power from the external source, then the supercapacitor unit 120 becomes the power source for the light source 130 and any other connected system, until at least one of a return of power from the external source 150 or the supercapacitor unit 120 running out of energy. In this manner, the elevator system may be provided with light in the event of a power shortage or outage. This may be particularly useful to meet safety requirements and regulations which require a backup power system in the event of an outage.

Moreover, the supercapacitor unit 120 provides significant advantages over traditional batteries, capacitors, and other backup power sources. Supercapacitors, also known as double-layer capacitors comprise thin, electrolyte-covered plates separated by an extremely thin permeable insulator. Activated carbon is a material typically used between the electrode plates.

Compared to traditional capacitors, supercapacitors have a significantly increased capacitance, i.e., 10-100× more energy per unit volume, due to the larger surface areas of the plates, and the smaller distances between the plates. Supercapacitors also charge quicker than standard capacitors and rechargeable batteries and can withstand a greater variety of environmental conditions and temperature fluctuations. Supercapacitors can charge in a matter of seconds, and have a lifespan of approximately 10-15 years, a charge/discharge life cycles into the millions, and an optimal operating temperature range between −40° C. to 85° C. On the other hand, batteries can take significantly longer to charge (i.e., on the order of minutes to hours), have a limited life (e.g., 500 cycles), and have much narrower range of operating temperatures (e.g., −20° C. to 65° C.).

In addition, unlike certain types of batteries, there are far fewer shipping and no significant portability issues with supercapacitors, as compared to certain types of batteries. The wider range of operating temperatures significantly enhances the supercapacitors' efficiency and ability to be immediately operable by the light system.

The above-noted features of supercapacitors also significantly reduce and/or eliminate many maintenance concerns regarding batteries. The significantly shorter battery life cycle requires more maintenance checks to ensure proper functioning of the system.

Accordingly, the increased reliability, durability, and lifespan of supercapacitors reduces risk that the light system does not work in the event of a power outage with respect to the external power source 150. In many applications, the use of a supercapacitor unit allows for a significantly longer time period in which backup light or power may be provided, as compared to batteries, and traditional backup power systems. As discussed herein, many applications of the light systems described herein include safety features, such as exit sign illuminations, and safety lights in stairwells, elevator cabs, and hallways. Many safety regulations require lighting in certain areas despite power outages or power issues, and the use of supercapacitors can increase the time of use and reliability of such systems over traditional backup methods.

Various embodiments as described herein can comprise a single supercapacitor or multiple supercapacitors. In systems that have a greater need to provide constant power to the light source, additional supercapacitors can be included as additional security to ensure that power is available for the light source during an outage. In addition, multiple supercapacitors can help ensure that power is available for a predetermined period of time after an outage. It will be appreciated that various configurations and embodiments can comprise one or more of each of the components depicted and described in FIG. 1. That is, the dual source light system, which comprises both an external and internal power source for the light source, can comprise one or more external power sources, supercapacitors, electronic units, and light sources and be consistent with the descriptions and illustrations herein.

In various embodiments, as discussed herein the housing unit 140 and its components may be applied to an elevator system, for example, as a source of backup power, or a safety light, in accordance with local, regional, and/or national safety standards. In particular, the supercapacitor(s) (e.g., size, number, etc.) may be selected such that when fully charged, the supercapacitor is able to power light source for a specific period of time required by a local, regional, or national safety standard. In some examples, the housing unit may be applied in or on an elevator, (e.g., and elevator floor, ceiling, wall, etc.) and connected to the elevator's power source, such that power of the elevator system directly charges the supercapacitors. Other applications include but are not limited to elevator shafts, wind turbines, tunnels, hallways, enclosures, and other areas where lighting, e.g., safety lighting or backup lighting may be required.

Figure 2:
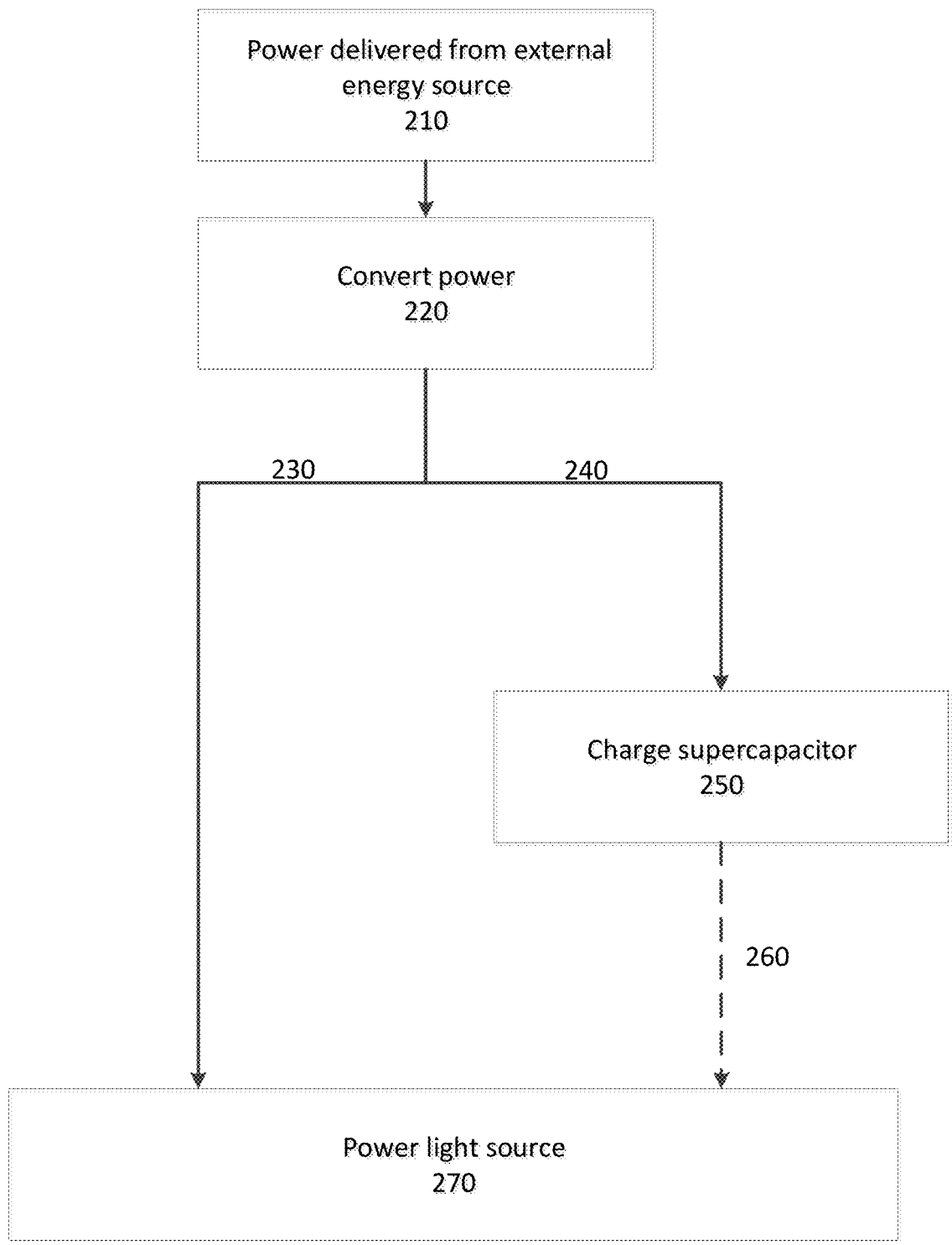
FIG. 2 illustrates power flow through a dual source light system in accordance with embodiments.

FIG. 2 illustrates power flow in accordance with the dual source light systems embodiments described herein. At step 210, power is delivered from an external energy source, such as a utility power source or generator as described above, including elevator systems, electric grids, etc. The power, which may be received at the electronic unit, is subsequently converted for subsequent usage in the light system 220. In some embodiments, AC power is delivered to the light system. In these cases, the electronic unit can be configured to convert the received power from AC to DC. In other embodiments, other types of power conversion, e.g., up/down conversion, using transformers or other methods and components to adjust the voltage. Power conversion 220 is an essential element of embodiments and assists with the proper power delivery and distribution to various components.

In a first mode of delivery 230, the converted power is directed to power the light source 230. When power is being received from an external light source, the primary function is to power the one or more light sources of the system. Then, through the second mode of delivery 240, some portion of the remaining power may be delivered to charge one or more supercapacitors 250 present in the system. This provides backup power for the light sources in the event of a power outage from the external energy source. As discussed herein, the proportion of power delivered to the light source 270 and supercapacitor 240 may be equal or unequal, and may or may not be dependent on an amount of converted power being delivered from the external energy source.

In some examples, the powering of the light source 270 may be prioritized such that a minimum amount of power is delivered to the light source before power is delivered the supercapacitor, or vice versa. In other examples, the received power is divided equally between the light source and supercapacitor. In another embodiment, the amount of power delivered to the supercapacitor or light source may be dependent upon one or more factors such as the current charge level of the supercapacitor, the energy requirements of the light source, changes in energy levels from the energy source, time of day, an external control, e.g., computer or manual control, or any of a plurality of factors and considerations.

Step 260 illustrates the power flow when the external energy source experiences an outage, or there is insufficient energy to power the light source. When this occurs, the power flow at 230, 240 ceases, and the charged supercapacitor delivers the required energy to power the light source(s) until such time that the external energy source is powered back on, or the supercapacitor runs out of energy to power the light source.

Figure 3:
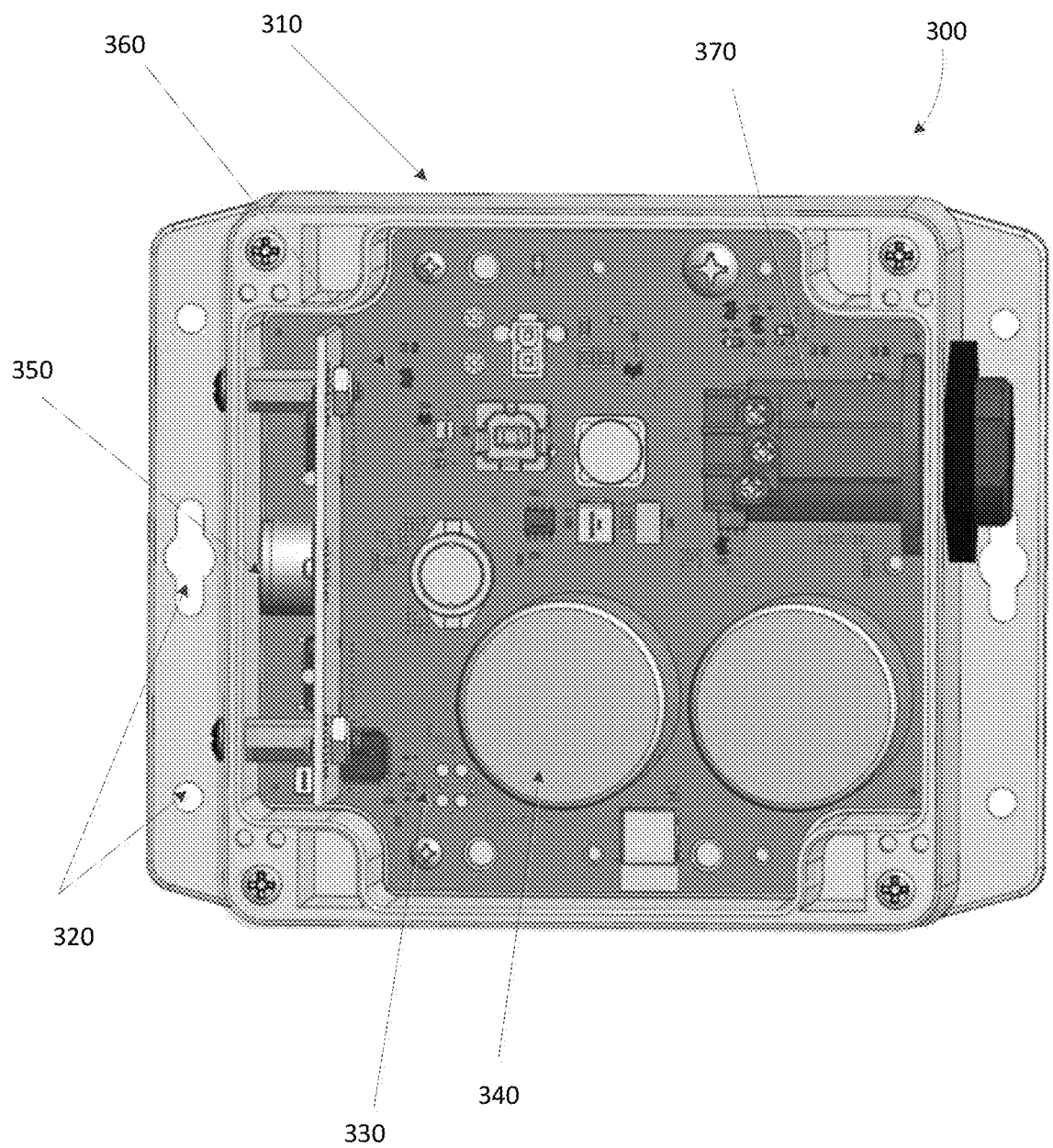
FIG. 3 illustrates a top view of a dual source light system in accordance with an embodiment.
Figure 4:
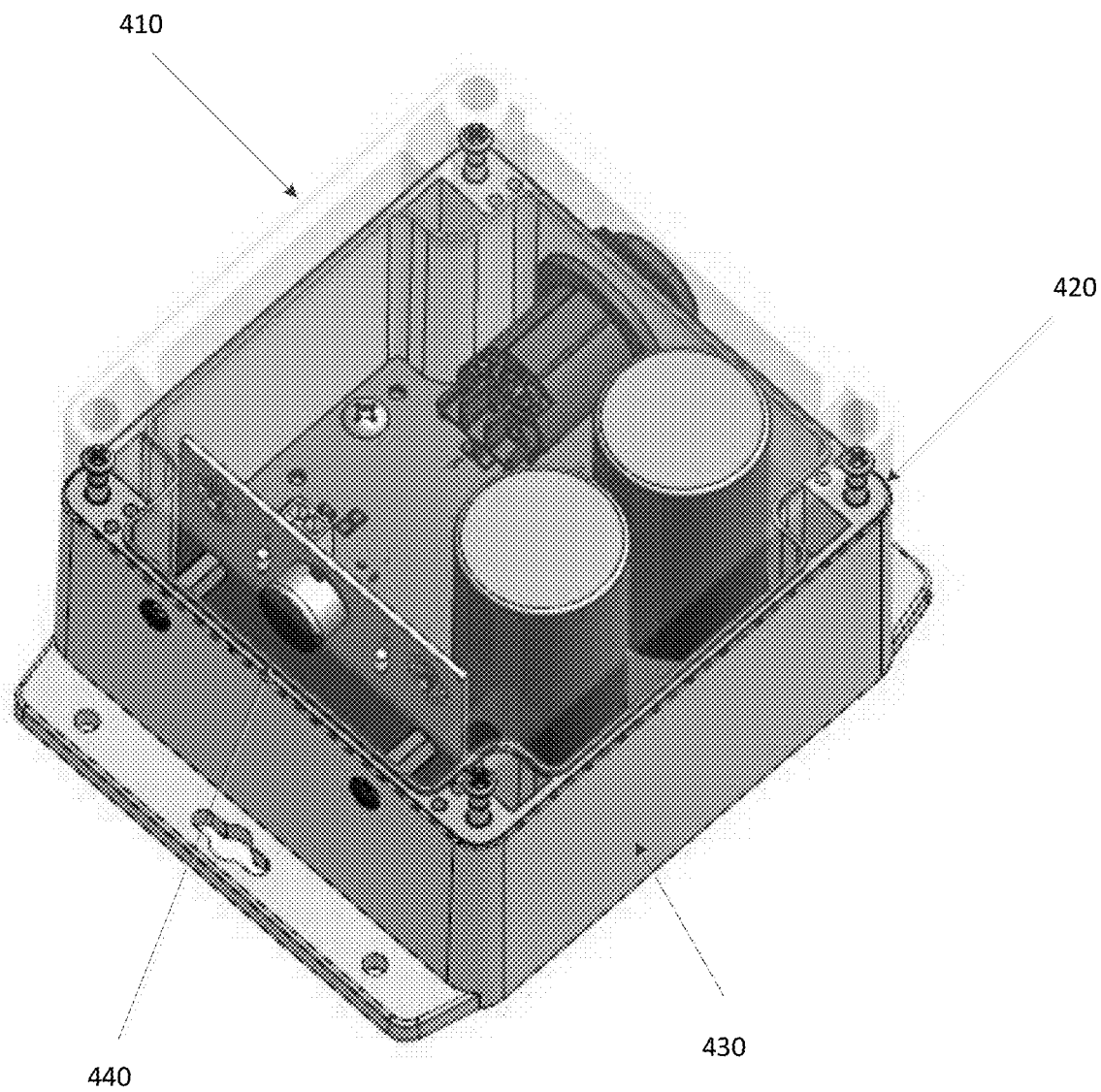
FIG. 4 illustrates a top, angled view of a dual source light system in accordance with an embodiment.
Figure 5:
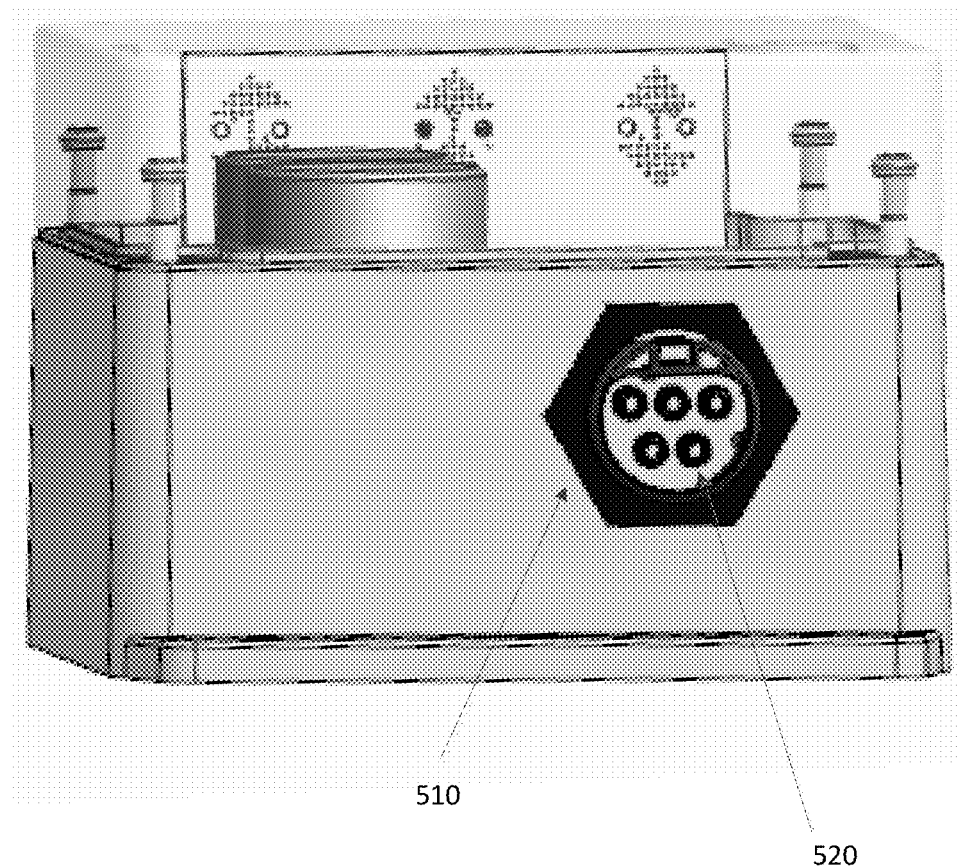
FIG. 5 illustrates a side view of a dual source light system in accordance with an embodiment.

In various embodiments, the type, size, and charge capacity of supercapacitor may vary depending on the power requirements of the light source. In other words, the type of supercapacitor may be selected based on factors such as the typical power expected to be received from the external energy source, the amount of energy required to power the light source, the amount of energy needed to power the light source for a particular FIGS. 3-5 illustrate various views of a dual source light system in accordance with embodiments described herein. The figures illustrate each of the components placed within a housing unit 310. The housing unit comprises an input for a plug or other means for receiving input and power from an external power source, such as an elevator system's power source. The electronics unit acts in accordance with the systems and methods discussed above to distribute the energy to the one or more light sources and the one or more supercapacitors, directly connected to the electronics unit.

In embodiments, the housing unit is a portable housing unit, which can be transported and/or applied to various applications. While a square-shaped housing unit is depicted, it will be appreciated that any configuration or combination of shapes and sizes can be utilized to fit within or in accordance with the intended application, and accomplish the features and functions described herein for the dual source light system. In embodiments, the housing unit can be constructed from one or a combination of materials, such as steel, metal, plastic, or other durable materials. Similar to the shape of the housing unit, the type of material can be specifically chosen for the intended use and location of the light source system.

The housing unit can further comprise one or more holes, openings, or features 320 for mounting the housing unit on a wall, ceiling, apparatus, or other device. Such features 320 can also be used to secure the housing unit to a specific location, for security and/or safety purposes.

The electronics unit 330 can comprise one or more electronic circuits placed within the housing unit 310. The electronic circuits can be positioned at the base of the housing unit. The one or more supercapacitors 340 can be directly mounted on the electronics circuit within the housing unit 310. Both the supercapacitors 340 and the light source 350 may be directly connected to the electronics unit. An external power unit connects to a power input source 370, which is also directly connected to the electronics unit 330. In examples, a charging LED 360 may be included to indicate that the supercapacitor unit and/or one or more components are charging. One or more fasteners can be used to secure the components to the electronics circuit and maintain placement of each of the components during shipping, transportation, and movement of the housing unit.

FIGS. 4 and 5 illustrate that housing unit embodiments can further comprise a removable top cover 410. The cover shields and protects the inner components from environmental agents, such as one or more of dust, water, extreme temperatures, and sunlight. As such, the cover can ensure that the inside of the housing unit waterproof and/or airtight, and at least protect the components from environmental damage and wear, thus improving the lifespan of the one or more components.

The removable cover allows access to the inner components for safety checks, regular maintenance and/or component replacement. In embodiments, the top cover comprises a clear, opaque, and/or transparent material so that the inner components are viewable, such as the charging LED 360. This can assist in identifying damage and expediting checks and maintenance for various components of the light source system. In other embodiments, the top cover conceals the inner components.

The cover 410 can be removable through one or more fasteners, e.g., screws 420, and in other embodiments, can be snap-fitted onto the main body 430 of the housing unit. It will be appreciated that any of a plurality of methods and devices can be utilized, alone or in combination to secure the housing cover 410 to the main body 430.

The light source 440 can be partially contained within, and partially extruding from the housing unit and/or cover. In some embodiments, the light source can be an LED, or a plurality of LEDs within a single lighting unit. Alternatively, or additionally, embodiments can comprise a plurality of lighting units comprising one or more LEDs. Some embodiments can comprise an adjustable lens or focusing device to angle the direction and intensity of the emitted light.

It will be appreciated that while LEDs are referenced as being a utilized light source, any of a variety of light sources and combinations of light sources can be used in accordance with embodiments described herein. For example, other types of lights that can be utilized include, but are not limited to colored LEDs, fluorescent lights, incandescent lights, and outdoor/weather-resistant lights.

FIG. 5 illustrates an angled, front view of the dual source light system and housing unit. The power input source 510 can comprise any of a number of designs and configurations based on the power source. The power input 510 can also be configured for a plurality of pins 520. In some examples, the power input source is interchangeable and adaptable to various power sources. In other examples, the power input comprises a 2-pin, 3-pin, or 5-pin configuration. Additionally, or alternatively the power input can be configured to receive 24 V, direct current, and/or alternating current. The electronics unit can accordingly be configured to adapt to various power input sources and power levels and manage the power delivery to the components of the system as described herein.

Figure 6:
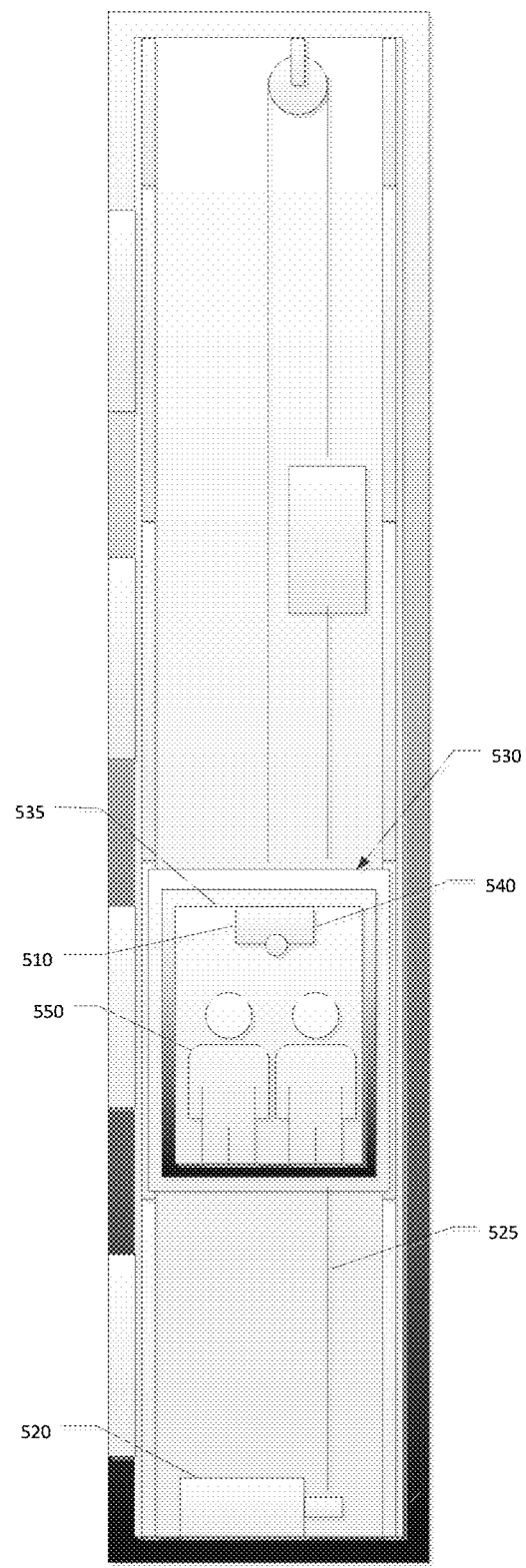
FIG. 6 illustrates a dual light source system installed in an elevator system, in accordance with an embodiment.

FIG. 6 illustrates an embodiment of the present invention as applied to an elevator system in a wind turbine. Wind turbines generally comprise a rotor attached to a plurality of blades that utilize wind power to rotate the blades, and generate electricity using a generator attached to the rotor complex. Such energy can then be supplied to an electrical grid. Wind turbines, especially industrial-grade wind turbines, can be extremely large, with the rotor and blade complex supported by a tower several hundred feet tall.

Elevator systems, cabins, platforms, structures, and the like may be found within the towers, to transport people and/or equipment up to the height of the tower, and to the rotor complex. Such elevator systems generally comprise an elevator platform or cabin, which may be suspended and moved using a plurality of ropes, cables (e.g., traction cables, safety cables, electric cables, etc.), belts, motors (including but not limited to hydraulic motors), and in some embodiments, counterweights. Some cables, such as traction wire ropes, may be used to hoist the elevator cabin, traveling along a substantially vertical track. The same or different cables may also supply electric power to the elevator platform or cabin. Electric cables may provide power to components within the elevator cabin/platform, such as a control panel, buttons lighting, and signal communication devices.

In the depicted embodiment, the dual light source system 510 within a housing unit, is installed inside an elevator 530 within a wind turbine and preferably connected to the same power source that provides power to the elevator cab. Although depicted to be mounted to an upper portion 535 or ceiling of elevator 530, it will be appreciated that the installation is not limited to such location and may be mounted to any area in or on the elevator system, including areas within or external to the elevator cab, such as the elevator shaft, and so forth. In addition, a plurality of housing units and dual light source systems may be installed on, within, or around the elevator cabin, wind turbine tower, or associated area.

As discussed herein, the present invention may receive energy from an external power source 520, through a first electrical connection 525 that may power one or more components of the elevator system. In various embodiments, in addition to providing power to at least one light source 540 of the lighting system 510, the power source may additionally provide energy to power the elevators normal operations, including raising and lowering the elevator cab, lighting other systems, control systems, and so on.

Consequently, in an event where the external power source fails to provide sufficient power to the lighting system, such as in an outage, the lighting system 510 may provide backup lighting to the at least one light source 540 using energy stored in the one or more supercapacitors. In this manner, lighting may still be provided for a period of time after the external power source 520 fails to provide the requisite power. As such, one or more users 550 within the elevator system may still be able to see and be provided with light until the power outage is resolved.

It will be appreciated that such configurations may be applied to similar environments such as other locations on or within the wind turbine, a mine shaft, tunnel, building, hallway, enclosure, or other area, especially where backup lighting or backup power and safety systems are necessary, useful, and/or required.

In general, the various components and processes described above can be used independently of one another or combined in different ways. All possible combinations and sub-combinations are intended to fall within the scope of this disclosure. The example systems and components described herein can be configured differently than described. As such, the disclosure is capable of other embodiments and of being practiced or carried out in various ways. For example, elements can be added to, removed from, or rearranged compared to the disclosed examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The phraseology and terminology used herein is for the purpose of description and should not be regarded as limiting. The term "plurality", as used herein, means more than one. The terms "a portion" and "at least a portion" of a structure include the entirety of the structure. Certain features of the disclosure which are described herein in the context of separate embodiments can also be provided in combination in a single embodiment. Conversely, various features of the disclosure that are described in the context of a single embodiment can also be provided separately or in any sub-combination.

While different figures may represent alternate embodiments, identical element numbers used in different figures are intended to represent similar elements. Additionally, although certain examples or illustrative examples have been described, these examples have been presented by way of example only, and are not intended to limit the scope of the subject matter disclosed herein. Indeed, the novel methods and systems described herein may be embodied in a variety of other forms. The accompanying claims and their equivalents are intended to cover such forms or modifications as would fall within the scope and spirit of certain subject matter disclosed herein. As one of ordinary skill in the art will readily appreciate from the disclosure of the present invention, processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. An elevator system comprising:
 an elevator cabin within a wind turbine;
 a traction wire rope for vertically driving the elevator cabin;
 a traveling power cable providing a power source to the elevator cabin;
 a housing unit installed in the elevator cabin, the housing unit containing a supercapacitor, an electronic circuit, and at least one light source, wherein the electronic circuit distributes energy received from the traveling power cable to power the at least one light source, and charge the supercapacitor using any remaining energy; and
 a control system configured to control how the electronic circuit distributes the energy between the light source and the supercapacitor, the distribution based on whether the energy satisfies an energy threshold,
 wherein, when the energy received from the traveling power cable is insufficient to power the at least one light source, the electronic circuit draws energy from the charged supercapacitor to power the at least one light source for a period of time to allow sufficient power to be received from the power source to power the at least one light source.

2. The elevator system of claim 1, wherein the electronic circuit allocates power between the at least one light source and the supercapacitor based on an amount of power received from the power source.

3. The elevator system of claim 1, wherein the at least one light source is at least one of an LED, a fluorescent light, an incandescent light, and an outdoor/weather-resistant light.

4. The elevator system of claim 1, wherein the traveling power cable is connected to the housing unit.

5. The elevator system of claim 1, wherein the supercapacitor powers the light source for a period of time required by a local, regional, or national safety standard.

6. The elevator system of claim 1, wherein the control system is further configured to direct the energy to one of the light or the supercapacitor with the energy below the threshold, and direct the energy to both the light and the supercapacitor with the energy above the threshold, wherein the control system is configured to prioritize the light or the supercapacitor with the energy above the threshold.

7. A method comprising:
 driving an elevator cabin along a vertical path using a traction wire rope;
 providing a power source to the elevator cabin using a traveling power cable;
 installing a housing unit within the elevator cabin, the housing unit containing a supercapacitor, an electronic circuit, and at least one light source;
 distributing energy received at the traveling power cable, to power the at least one light source and charge the supercapacitor using any remaining energy; and
 controlling, by a control system coupled with the electronic circuit, the distribution of the energy between the light source and the supercapacitor based on whether the energy satisfies an energy threshold,
 wherein, when the energy received from the traveling power cable is insufficient to power the at least one light source, the electronic circuit draws energy from the charged supercapacitor to power the at least one light source for a period of time to allow sufficient power to be received from the power source.

8. The method of claim 7, wherein the energy from the power source comprises alternating current, and the method further comprises converting the alternating current to direct current before distributing the energy.

9. The method of claim 7, further comprising converting a voltage of the energy received from the power source before distributing the energy.

10. The method of claim 7, wherein the at least one light source is an LED.

11. The method of claim 7, wherein the at least one light source is a safety light for illuminating at least one an elevator, a hallway, a construction area, and an exit sign.

12. The method of claim 7, wherein the power source is not a battery.

13. The method of claim 7, further comprising allocating power, by the electronic circuit, between the at least one light source and the supercapacitor based on an amount of power received from the power source.

14. A dual source light system, comprising:
at least one light source;
a supercapacitor;
an electronic circuit receiving energy from an external power source, and being electrically connected to the external power source, the at least one light source, and the supercapacitor;
a housing unit installed in an elevator cabin within a wind turbine, the housing unit containing the supercapacitor, the electronic circuit, and at the least one light source, wherein the electronic circuit distributes energy received from the external power source energy to power the at least one light source, and charge the supercapacitor using any remaining energy; and
a control system configured to control how the electronic circuit distributes the energy between the light source and the supercapacitor, the distribution based on whether the energy satisfies an energy threshold,
wherein, when the energy received from the external power source is insufficient to power the at least one light source, the electronic circuit draws energy from the charged supercapacitor to power the at least one light source for a period of time to allow sufficient power to be received from the external power source to power the at least one light source.

15. The dual source light system of claim 14, wherein the at least one light source is at least one of an LED, a fluorescent light, an incandescent light, and an outdoor/weather-resistant light.

16. The dual source light system of claim 14, wherein the electronic circuit allocates power between the at least one light source and the supercapacitor based on an amount of power received from the power source.

17. The dual source light system of claim 14, wherein the at least one light source is used as a safety light.

18. The dual source light system of claim 14, wherein the is supercapacitor is directly connected to, and mounted on the electronic circuit.

19. The dual source light system of claim 14, wherein the at least one light source extends through an opening on the housing unit.

20. The dual source light system of claim 14, wherein the housing unit comprises a removable top cover.

\* \* \* \* \*